United States Patent [19]
Chacko et al.

[11] 3,712,417
[45] Jan. 23, 1973

[54] INFLATABLE EVACUATION SLIDE

[75] Inventors: Joseph Chacko, Corte Madera, Calif. 94925; Robert S. Satterfield, Pleasant Hill, Calif. 94941

[73] Assignee: Sargent Industries, Inc., Los Angeles, Calif.

[22] Filed: April 5, 1971

[21] Appl. No.: 131,270

[52] U.S. Cl. ................................. 182/48, 193/25
[51] Int. Cl. .......................... A62b 1/20, B65g 11/10
[58] Field of Search ......................... 182/48; 193/25

[56] References Cited

UNITED STATES PATENTS

| | | | |
|---|---|---|---|
| 3,458,009 | 7/1969 | Favors | 182/48 |
| 3,370,684 | 2/1968 | Holcombe | 193/25 B |
| 2,765,131 | 10/1956 | Boyle | 193/25 B |
| 3,391,771 | 7/1968 | Day | 182/48 |
| 3,463,266 | 8/1969 | Day | 182/48 |
| 3,463,287 | 8/1969 | Smith | 182/48 |
| 3,102,623 | 9/1963 | Schacht | 182/48 |
| 3,092,232 | 6/1963 | Adams | 193/25 B |

Primary Examiner—Reinaldo P. Machado
Attorney—Smyth, Roston & Pavitt

[57] ABSTRACT

An inflatable slide, for use in emergency evacuation of aircraft, including upper and lower inflation tube assemblies which are suitably bound together. A taut, relatively frictionless material is positioned between the upper and lower assemblies to provide a slide surface which is both protected by and depressed below the upper tube assembly. Suitable airflow paths are provided in the assemblies for producing predetermined sequential inflation of each assembly to ensure that, when the slide is inflated, it attains a position in which it may be properly used. The slide is held to the aircraft by a releasable stitch-locking means which allows the slide to serve as a raft when it is unlocked.

15 Claims, 8 Drawing Figures

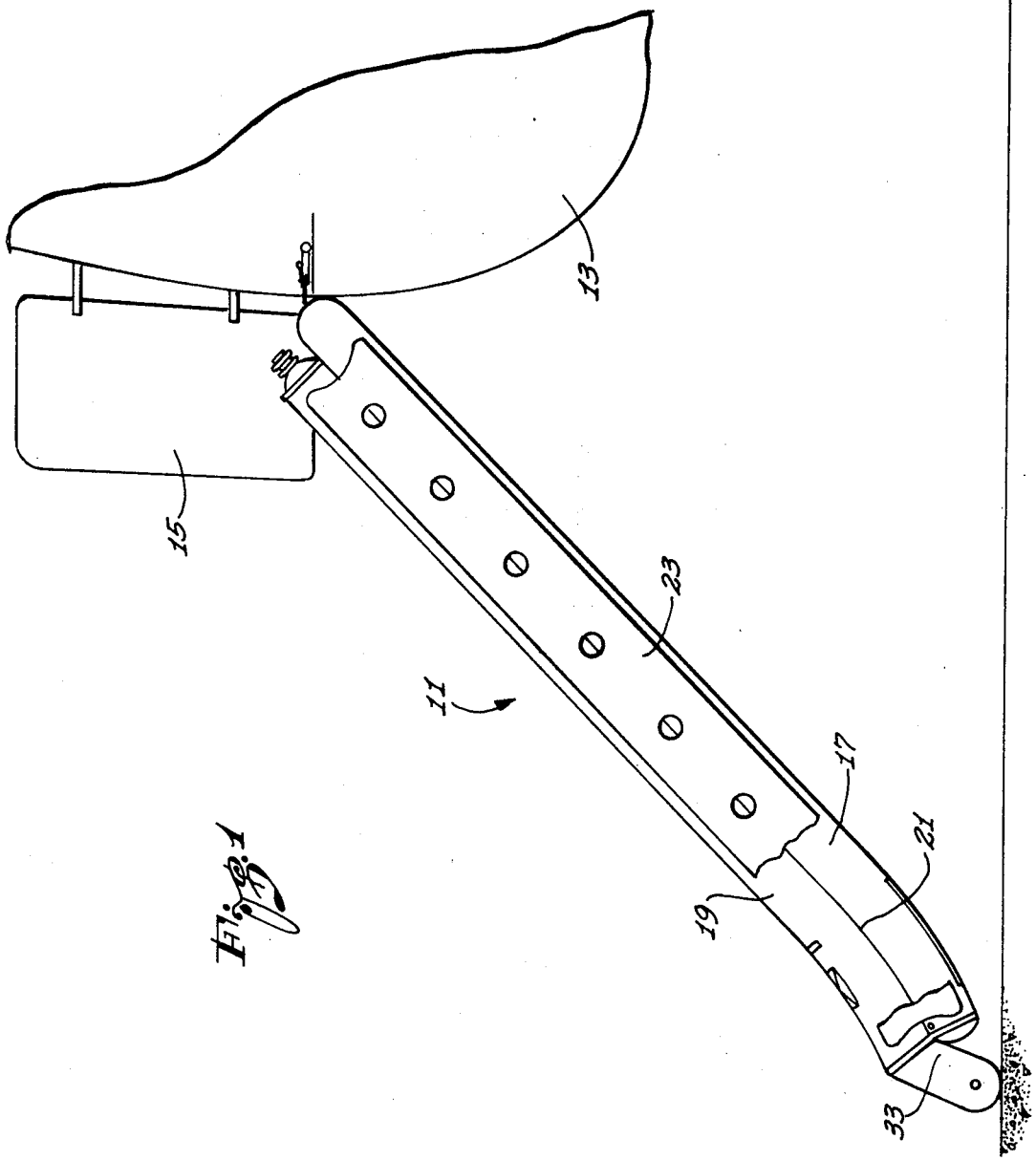

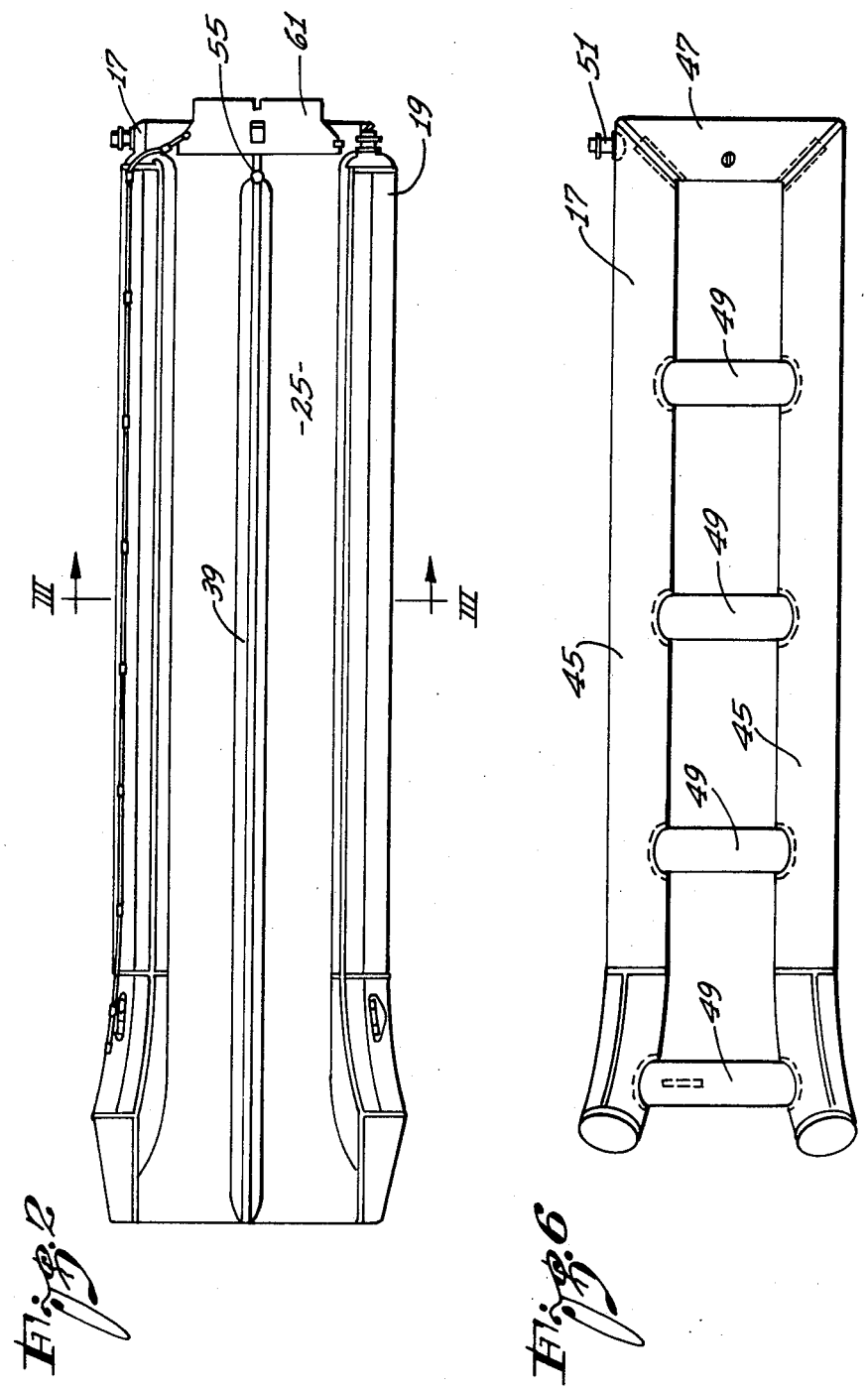

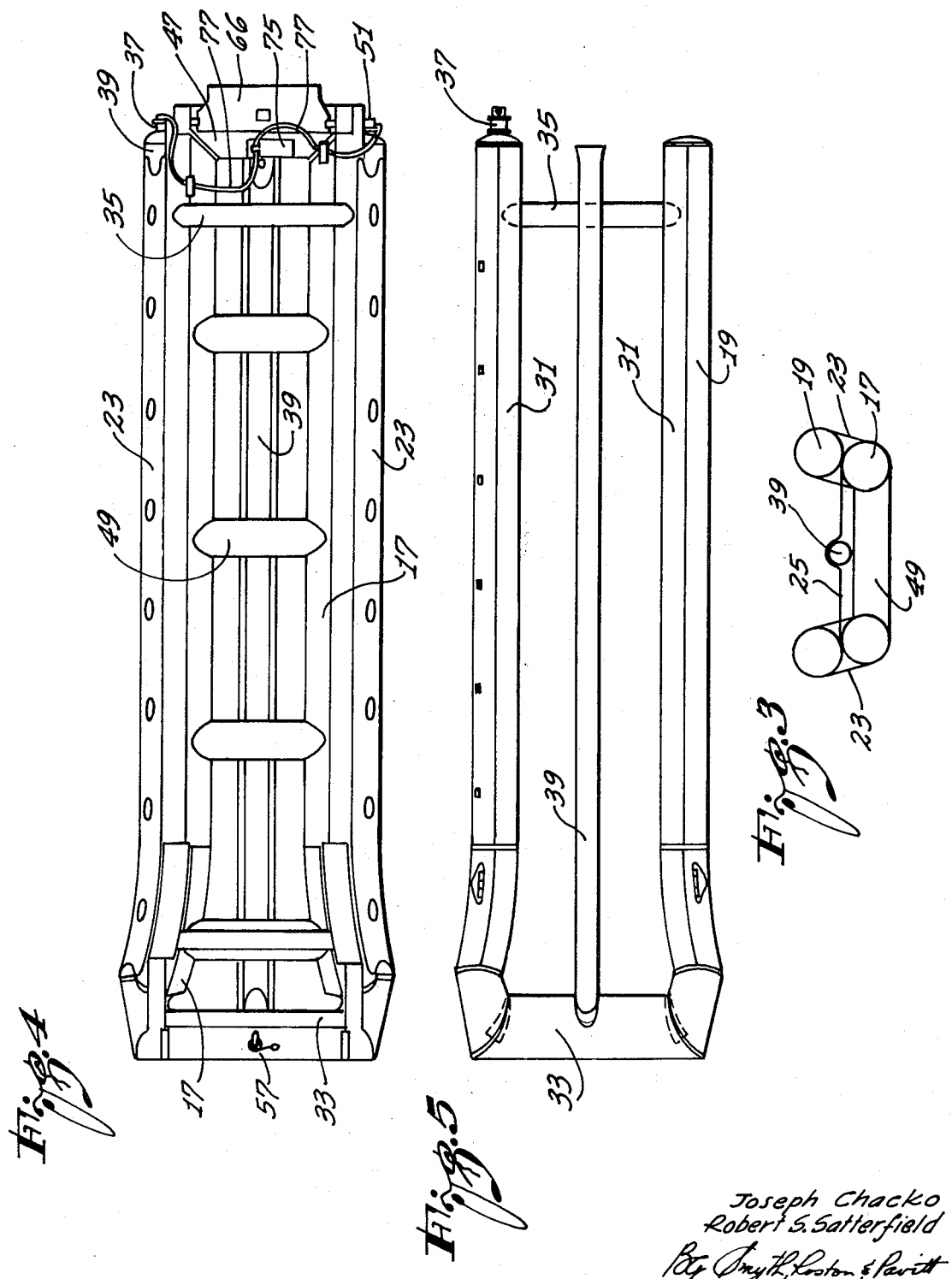

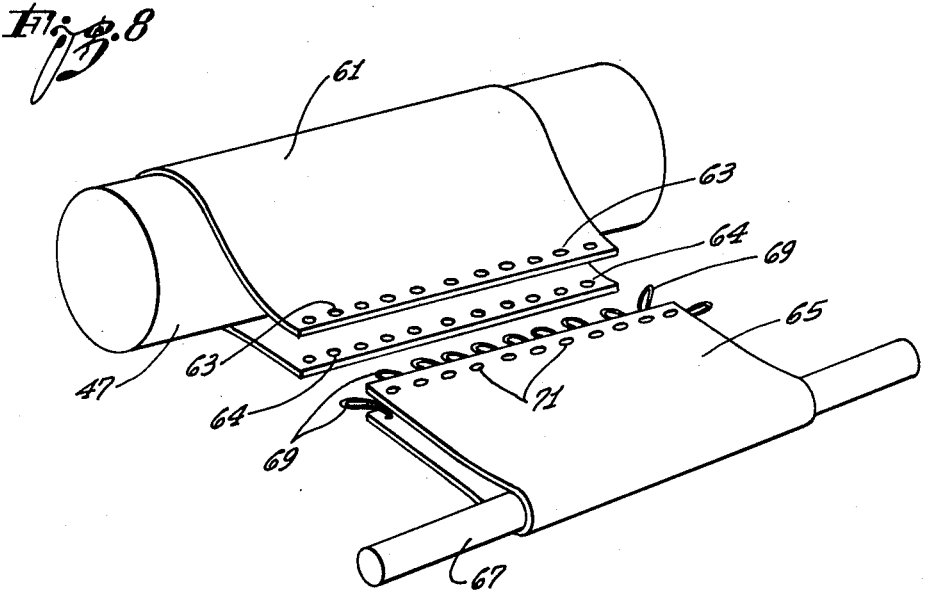
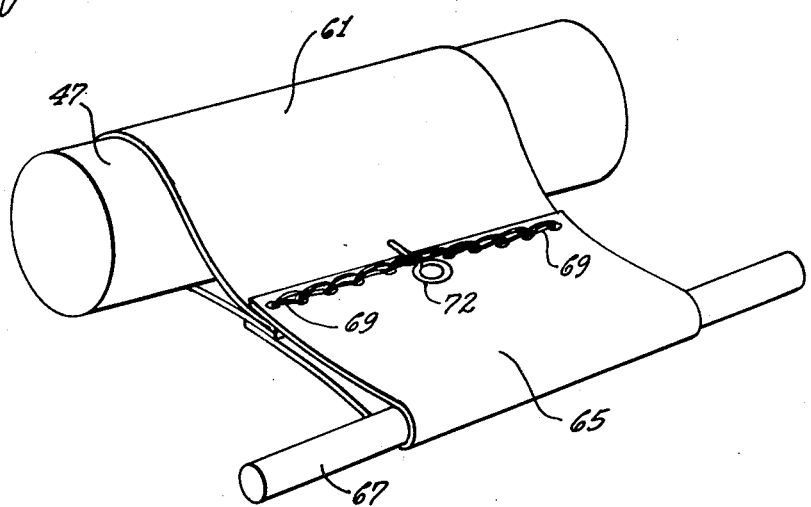

INFLATABLE EVACUATION SLIDE

BACKGROUND OF THE INVENTION

When aircraft land under conditions in which no passenger evacuation services are available, such as when they are force-landed or ditched, escape apparatus must be provided so that passenger and crew evacuation can be accomplished in a relatively short period of time in order to ensure safety. In fact, government aircraft safety regulations require that apparatus be provided so that all passengers and crew members can be evacuated from a downed plane within a relatively short period, such as 90 seconds.

In addition to being a safety problem, this requirement also becomes an economic problem since the regulations specify that that number of people who can be evacuated during the regulated time period is the maximum number to be carried by the aircraft at any time. Thus, the evacuation safety loading capacity of the aircraft limits the number of passengers which may be carried in an airplane, even though more passengers could be accomodated in the aircraft in an otherwise safe manner without violating load limits, etc.

Obviously, even if an aircraft is provided with a built-in stairway, it is desirable to provide some apparatus by means of which passengers can be evacuated at a rate greater than that possible by normal deplaning methods. Therefore it has become common to provide a slide which extends from each of the normal and/or emergency exits of the aircraft to provide an easy means of escape from the exits which, under normal forced landing conditions, are elevated above the ground. In use, an evacuee walks to the door of the aircraft, jumps onto the slide, and slides down to the ground.

In the interest of space conservation aboard the aircraft, as well as providing the auxiliary life raft-type device upon which the evacuees may ride in the event the aircraft is ditched in water, the slide is an inflatable device which can be folded very compactly into a relatively small case. In many aircraft, the case is mounted on the door of the craft and a locking bar is positioned, when the door is closed, so that opening of the door automatically causes the release and inflation of the slide unless the locking bar is first detached. This automatic inflation obviously serves to reduce the amount of time necessary for evacuating the aircraft.

When the slide is to be used as a life raft, detachable means which are built into the slide are severed so that the life raft may be moved away from the plane, which, in most instances, will sink within a fairly short time. It is to be noted that when an airplane is downed in water, its doors will be at or near the water level and the slide will open at such an angle that evacuees can walk out onto it rather than jumping and sliding on it.

The slides in present use today generally comprise a single inflatable tube system. The tube system supports a slide surface which is firmly attached to it.

It has been found that the presently available slides tend to reduce the evacuation rate since the slide surface is relatively unprotected and persons standing in the aircraft looking down at the slide tend to hesitate before jumping onto it; there is an apparent danger that an evacuee could fall off the side of the slide and injure himself. Additionally, these slides make relatively uncomfortable life rafts since the slide surface upon which the passengers must sit or recline are unprotected from wind and waves and are difficult to hang onto in even moderate seas.

Therefore, it has become desirable and necessary to develop a slide concept which fulfills all of the intended purposes for such devices while eliminating the deficiencies inherent in the presently available apparatus.

SUMMARY OF THE INVENTION

The present invention relates to an inflatable slide which may be quickly and easily extended from a downed or ditched aircraft and onto which evacuees can jump quickly and confidently to slide to the ground. More specifically, the invention relates to such an apparatus in which the slide surface is recessed within the body of the slide to prevent evacuees from falling off the sides and injuring themselves and also to obviate the apparent possibility of the occurrence of such an event.

In general, a slide formed in accordance with the present invention comprises a lower inflation tube assembly which is attached at one end of the aircraft. The distal end thereof is fastened to the undersurface of an upper inflation tube assembly at a location between the ends of the upper assembly. Each assembly comprises a plurality of inflatable tubes, having a single elongated tube on each side thereof.

A relatively slippery slide surface is mounted between the elongated side tubes of the upper and lower assemblies so that the elongated tubes of the upper assembly act as side walls for the slide.

The distal end of the upper inflation tube assembly, i.e., that which is farthest from the aircraft, is so formed and shaped that when an evacuee reaches that point of the slide, he is automatically brought to a nearly upright position; when he leaves the slide he is forced to walk or run out of the way of the next evacuee, rather than falling to the ground in a seated position.

Slides formed in accordance with the present invention may be used with any type and size of aircraft including those currently referred to as "jumbo jets." When a device such as this is placed on a large plane and is inflated during an emergency situation, it is necessary that the sequence of inflation of the various portions be such that the slide is properly positioned when inflation is completed. A slide would be useless if it inflated in such a manner that wind could drive the uninflated portion under the aircraft so that, when inflation was completed, it would become locked or wedged beneath the plane.

According to the present invention, the upper and lower inflatable tube assemblies are each inflated by a separate aspirator apparatus, such as one of those described in U.S. patent application, Ser. No. 68,511 of Joseph Chacko, filed Aug. 31, 1970, or Ser. No. 813,660 of Ronald H. Day, filed Apr. 4, 1969. In both tube assemblies, such an aspirator is positioned at the upper portion, i.e., adjacent the door of the plane.

The entire slide assembly is packed within a case which is mounted on the inside of the aircraft door. A bar is attached to the assembly adjacent the lower outside of the case by means of a releasable lock stitch device which allows the entire slide to be detached from the aircraft after it has been inflated so that it may be used as a raft when necessary.

In use, when the door of the plane is closed, one of the members of the crew fastens the bar to a position on the floor of the plane. If the bar is not released from that position before the door is next opened, opening will cause actuation of the aspirators and inflation of the slide. Near the lower or outer end of the slide, a tieback assembly fastened thereto is releasably connected to a complementary assembly near the upper or inner end of the slide.

When the aspirators begin to inflate the slide, air enters the upper end of both the upper and lower assemblies and travels along the elongated side tubes toward the outer end of the slide. As the side tubes expand, a release force is imposed upon the tie-back assembly and, when a predetermined pressure is reached, the tieback assemblies will separate and the lower end of the slide will snap outwardly and downwardly until it contacts the ground in the position in which it is to be located for use. It should be noted that the speed with which the tube assemblies are inflated is fast enough so that between the time the tie-back assembly releases and the lower end of the slide contacts the ground, nearly all of the air which will be used to inflate the assemblies will have passed through the aspirators and into the tubes. Thus, the slide is prevented from opening underneath the aircraft.

The lower tube assembly comprises a substantially U-shaped inflatable tube having a plurality of support tubes which extend between the elongated sides of the U-shaped member. The lower inflation tube assembly is formed such that the open ends of the U-shaped member are near the bottom of the slide when it is inflated. These ends are curved upwardly to a slight degree to support the lower end of the upper tube assembly in a manner to be described.

The upper inflation tube assembly also comprises a generally U-shaped inflation tube but the open ends of the U-shaped member are positioned at the upper end of the slide, i.e., adjacent the aircraft. A cross-inflation tube is formed between the open ends of the upper assembly so that the legs of the upper assembly U-shaped member will inflate simultaneously.

The lower end of the upper tube assembly curves upwardly a slight amount and then drops off downwardly at a relatively sharp angle. The curved open ends of the lower tube assembly support the gradual curve near the end of the upper tube assembly and cooperate to force a person coming down the slide into a position such that he will be in a standing position when his feet reach the ground so that he will be forced to run or walk away from the slide and will be able to quickly get out of the way of the next person coming down it.

In double slides, i.e., in which two people may slide down the slide simultaneously, a central divider strip is formed in the slide by a center inflation tube which is formed as a part of the upper inflation tube assembly and is attached to the lower end thereof. In the double slide unit, the elongated sides of the U-shaped member will inflate first, the lower end of the U-shaped member will then inflate, and the divider ramp will be inflated last. This inflation sequence allows the assembly to be inflated at a rapid rate and to fall in the proper position without interference from the divider strip tube as it is being inflated.

In summary, the present invention relates to a very strong slide device which is inflatable in a very short time, supports the weight of a number of persons simultaneously, inflates in a sequential manner such that it is prevented from falling to any but the correct position, forces evacuees to leave the slide in a standing position to clear the area at the bottom of the slide for the next person using it and prevents injuries or the appearance of potential injuries which could occur if an evacuee could fall off the side of the slide. It is apparent, therefore, that a slide of this type will produce the optimum results in allowing evacuation of the aircraft in a very short period of time.

The invention, together with further objects, advantages, modes and embodiments, will be readily understood by those skilled in the art through reference to the following Detailed Description which is correlated to the accompanying drawings. Those drawings merely illustrate what is presently considered to be a preferred embodiment of the best mode presently contemplated for utilizing the novel principles of the invention which is encompassed by the claims hereof.

BRIEF DESCRIPTION OF THE DRAWINGS

FIG. 1 is a side elevation, partly broken away, of a slide formed in accordance with the present invention in a position in which it might extend from an aircraft;

FIG. 2 is a top plan view of the slide shown in FIG. 1;

FIG. 3 is a sectional view of the slide shown in FIG. 2, taken along a line II—II thereof;

FIG. 4 is a bottom view of the slide shown in FIG. 1;

FIGS. 5 and 6 are top plan views of the lower and upper inflation tube assemblies, respectively; and FIGS. 7 and 8 are perspective illustrations of the device by means of which the slide is attached to a plane, showing the device with the slide attached and detached therefrom respectively.

DETAILED DESCRIPTION

Referring now to the drawings in greater detail, there is shown in FIG. 1 a slide assembly 11 which is attached to an aircraft 13 at the location of a door 15 thereof. The slide assembly 11 basically comprises a lower inflation tube assembly 17 and an upper inflation tube assembly 19 which are fastened together throughout their lengths on both sides of the slide by a suitable bonding means along their common abutment surface 21 and by a side cover 23, also on each side of the slide. As shown in FIGS. 2 and 3, a relatively slippery surface material 25 is fastened between the lower and upper assemblies 17 and 19, and it is on this slide material 25 that persons leaving the aircraft are seated.

As shown in FIG. 5, the upper tube assembly 19 comprises a U-shaped member having a pair of elongated side tubes 31 which are interconnected at the lower end of the slide by a cross support member 33 and at the upper end by an inflation cross tube 35. An aspirator 37 of any well-known type is installed at the end of one of the tubes 31 so that, when it is actuated, air will enter the tube 31 and travel toward the ground support tube 33. Air will also pass through the cross tube 35 into the opposite side tube 31 so that it will inflate simultaneously with the first side tube.

In a single lane slide, no other tubes need be present in the upper inflation tube assembly. However, when a slide is to be very wide so that two persons can slide down the material 25 simultaneously, a center divider, collision-prevention strip tube 39 is formed which will receive air from the ground support tube 33 as the latter becomes inflated. As shown in FIG. 5, the upper end of the divider tube 39 is also supported by the cross inflation tube 35.

Referring to FIGS. 2 and 3, the center divider tube 39 will expand upwardly into the slide path to prevent evacuees on opposite sides of the axis of the slide tube from colliding as they depart from the aircraft.

Referring now to FIG. 6, the lower inflation tube assembly 17 comprises a U-shaped member having a pair of elongated leg portions 45 interconnected at the upper end of the slide by a cross member 47 and, at a plurality of intermediate locations, by other cross members 49. As shown in FIG. 3, the cross members 49 provide greater support to the slide to prevent both injury to evacuees and damage to the slide. The cross support tubes 49 also serve to support the center divider tube 39.

An aspirator 51 is positioned near the upper end of the lower assembly 17 so that air injected into the assembly will inflate the cross tube 47, the side tubes 45, and the cross support tubes 49.

Referring again to FIG. 3, it will be seen that the lower assembly 17 is somewhat narrower than the upper assembly 19. This feature causes each evacuee to be biased toward the center of his slide lane and also provides greater support for the slide surface to prevent it from sagging and/or being subjected to damage.

As shown in FIG. 2, near the upper end of the slide surface 25, a suitable tie-back assembly 55 of any well-known type may be firmly attached to the slide. In FIG. 4, a complementary assembly member 57 is shown fastened to the bottom surface of the cross support tube 33. Although the specific configuration of the tie-back assembly is not a part of the invention hereof, when the tube assemblies are folded into the case which is mounted on the inside of the plane door 15, the assembly 57 is attached to the upper assembly 55. As the tube assemblies 17 and 19 are inflated, a stress is generated causing the two tie-back assemblies to become separated. The forces exerted on the tie-back are carefully calculated so that it will not separate until a predetermined force is exerted thereon, at which time a large percentage of the inflation of the two tube system has been accomplished. When the tie-back separates, the slide will open to the position shown in FIG. 1 and any further inflation will continue at a rapid rate so that, when the cross support tube 33 contacts the ground, substantially all of the inflation will have been accomplished and the slide will be prevented from attaining a position in which it is wedged beneath the airplane.

Referring now to FIGS. 7 and 8, a panel 61, which may be formed as a pair of units or as a single unit, extends from above and beneath the upper tube 47 of the lower inflation tube assembly and is provided at its ends with a plurality of apertures 63 and 64 which, if desired, may be provided with suitable grommets. A complementary panel 65 is wrapped around a suitable rod or bar 67. A plurality of fabric loops 69 are fastened to one end of the panel 65 and a like number of apertures 71 are formed in the opposite end of that panel. If desired, the apertures 71 may also be provided with suitable grommets.

Referring now specifically to FIG. 7, the ends of the panel 65 are positioned over the ends of the panel 61 and the fabric loops 69 are passed through coaxial apertures 63 and 64 in the panel 61 and coaxially located apertures 71 in the opposite end of panel 65. Each outboard loop is then threaded over the adjacent loop, which is then threaded over the loop adjacent to it, etc. Working inward from either side, when two loops from the opposite directions are threaded over the central loop, a pin 72 may be passed through the central loop to lock all of the loops together and firmly fasten the panel 65 to the panel 61.

As explained previously, the bar 67 is fastened within the aircraft and, when the door is opened during an emergency, suitable means (not shown) actuate the aspirators 37 and 51 by means of a bottle of compressed air 75 which passes through a pair of hoses 77 to each of the aspirators (FIG. 4).

When the slide is to be removed from the aircraft after use, or when it is to be used as a raft during an emergency ditching at sea, and the passengers have been properly loaded aboard it, the pin 72 may be pulled from its location in the lock stitches 69 and the loops will be free to unthread themselves; the panels 61 and 65 are quickly separated as the assembly 11 moves away from the aircraft 13.

Having now completed a detailed description of only one form of the invention that is delineated by the following claims, it will be realized that the invention thus claimed provides a new and improved concept in the art of safety equipment which yields a true advancement in that art. Many modifications, alterations, and other embodiments of the invention will now become apparent to those skilled in the art without requiring departure from the invention.

Wherefore what is claimed as the invention is:

1. An evacuation slide comprising
    an upper inflatable tube assembly having
        a pair of legs and a cross support communicating with the side legs to provide for a simultaneous inflation of such side legs; and
        first means providing for the introduction of fluid under pressure into the side legs and the cross support;
    a lower inflatable tube assembly having
        a pair of side legs and a cross support communicating with the side legs in the lower inflatable tube assembly to provide for a simultaneous inflation of such side legs; and
        second means for providing for the introduction of fluid under pressure into the side legs and the cross support; and
    a relatively slippery material fastened between said pair of side legs of said upper and lower tube assemblies,
    the upper inflatable tube assembly being pneumatically independent of the lower inflatable tube assembly.

2. The evacuation slide of claim 1 including
    means provided in a least one of said upper and lower tube assemblies for forming a particular angular relationship in said relatively slippery material at one end of the evacuation device to provide for a person sliding on said relatively slippery material to leave the device in an upright position.

3. The evacuation slide of claim 1 wherein
at least a particular one of said upper and lower inflatable tube assemblies includes
an elongated inflatable member located substantially in the center of the device to provide a lane divider means in said relatively slippery material.

4. The evacuation slide of claim 3 wherein a cross support of the particular one of said upper and lower inflatable tube assemblies includes a cross support at the bottom end of the side legs in the inflatable tube assemblies, such cross support communicating with the side legs and the elongated inflatable member to provide for inflation of the elongated inflatable member.

5. The evacuation slide of claim 1 including
means for providing for the simultaneous introduction by the first and second means of fluid under pressure respectively to the upper and lower inflatable tube assemblies.

6. The evacuation slide of claim 1 wherein the evacuation slide includes support means for attaching the slide to apparatus for evacuating evacuees from such apparatus and wherein means are included for detachably coupling the evacuation slide to the support means to retain the slide in coupled relationship to the support means during the evacuation of the evacuees from the apparatus and to provide for a detachment of the slide from the apparatus after such evacuation.

7. An evacuation slide comprising
an upper inflatable tube assembly having
a pair of elongated side tubes, and cross supports for providing for a simultaneous inflation of the side tubes,
a lower inflatable tube assembly having
a pair of elongated side tubes, and cross supports for providing for a simultaneous inflation of the side tubes, the upper and lower tube assemblies being individually inflatable and being pneumatically individual from each other,
a relatively slippery material fastened between said pair of elongated side tubes of said upper and lower tube assemblies and at least partially supported by said elongated side tubes of said lower tube assembly and forming
at least one slide lane extending along the surface thereof, and
means for providing for a simultaneous inflation of the side tubes in said upper and lower tube assemblies.

8. The evacuation slide of claim 7 wherein
said upper inflatable tube assembly further comprises
a ground contact, lower inflatable cross tube in pneumatic communication with said side tubes, of said upper inflatable tube assembly, and a suitable curvature being preformed in the lower portions of said side tubes in said upper inflatable tube assmebly to force an evacuee traversing said relatively slippery material to depart from the device in a substantially upright position.

9. The evacuation slide of claim 8 including
a centrally located divider tube extending from said ground-contact cross tube between and substantially parallel to said side tubes below said relatively slippery material to form a lane divider therein, said centrally located divider tube communicating pneumatically with said ground-contact cross support to become inflated substantially after the inflation of said side tubes of said upper inflatable tube assembly.

10. The evacuation slide of claim 8 wherein
said inflatable tube assembly further comprises
a plurality of inflatable cross support tubes pneumatically interconnecting said pair of elongated side tubes in said lower inflatable tube assembly.

11. The evacuation slide of claim 7 wherein
said upper inflatable tube assembly further comprises
means for providing for the introduction of fluid under pressure into said upper inflatable tube assembly and
said lower inflatable tube assembly further comprises
means for providing for the introduction of fluid under pressure into said lower inflatable tube assembly.

12. The evacuation slide of claim 7 including
means coupled to opposite ends of the slide for preventing the slide from being opened to its outermost extension until a predetermined volume of air has been injected into said upper and lower inflatable tube assemblies.

13. The evacuation slide of claim 7 wherein the slide is constructed to evacuate evacuees from a body and wherein
means are provided for releasably attaching the slide to the body which is to be evacuated.

14. The evacuation slide of claim 13 wherein the releasable attaching means includes support means for attaching the slide to the body for evacuating evacuees from such body and wherein means are included for detachably coupling the evacuation slide to the support means to retain the slide in coupled relationship to the support means during the evacuation of the evacuees from the body and to provide for a detachment of the slide from the body after such evacuation.

15. The evacuation slide of claim 7 wherein the axial separation of said side tubes in said lower inflatable tube assembly is less than that of said upper side tubes in said upper inflatable tube assembly, thereby biasing an evacuee on said relatively slippery material toward the center of said at least one slide lane and providing enhanced support to said material.

* * * * *